April 11, 1967 E. MACHINSKI 3,313,889

MAGNETIC HEAD WITH THIN EDGE POLE PIECES

Filed June 12, 1961 4 Sheets-Sheet 1

EDWARD MACHINSKI
*INVENTOR*

BY Bonniard D. Brown
*ATTORNEY*

EDWARD MACHINSKI
INVENTOR

BY Bernard I. Brown
ATTORNEY

MAGNETIC HEAD WITH THIN EDGE POLE PIECES

Filed June 12, 1961 4 Sheets-Sheet 3

EDWARD MACHINSKI
INVENTOR.

BY Boniard I. Brown
ATTORNEY

EDWARD MACHINSKI
INVENTOR.

BY Boniard I. Brown
ATTORNEY

United States Patent Office 3,313,889 Patented Apr. 11, 1967

3,313,889
MAGNETIC HEAD WITH THIN EDGE POLE PIECES

Edward Machinski, 3715 Milbury Ave., Baldwin Park, Calif. 91706
Filed June 12, 1961, Ser. No. 116,496
7 Claims. (Cl. 179—100.2)

The present invention relates generally to electromagnetic transducers; more particularly, the invention relates to magnetic recording devices wherein thin edge means define recording flux of thin configuration.

The present application is a continuation-in-part of the application of Edward Machinski, Ser. No. 80,128, now abandoned, filed on Jan. 3, 1961.

Conventionally magnetic recording of intelligence is effected by subjecting a record medium to a varying magnetic field in the region of a non-magnetic gap of a recording head during relative movement between the record medium and the head. To reproduce the recorded intelligence, the record medium is moved across a non-magnetic gap of a head to induce in the head a magnetic field which varies in accordance with variations in residual magnetism on the record medium and which induces a correspondingly varying voltage in a coil on the head. Such conventional recording is characterized by certain disadvantages and shortcomings. The fineness of resolution of intelligence is largely dependent upon the size of the non-magnetic gap. The non-magnetic gap and the magnetic recording flux gradient in its region impose limitations upon the fineness of resolution of recorded intelligence and upon the frequencies recordable. The prior art has therefore been much concerned with the minimizing of gap sizes and with associated problems. Special systems and/or high relative velocities between recording heads and record mediums are required for the accurate recording of high frequency intelligence. Dynamic range is limited because of the geometry of the recording flux in relation to the record medium. Spacing between the transducer head and the record medium has been quite critical, because variations in the spacing cause considerable distortion of intelligence.

The present invention provides electromagnetic transducers wherein thin edge means are disposed adjacent to a record medium at a substantial angle to the direction of relative movement between the record medium and the edge means. The thin edge means are in a magnetic circuit in which is induced a magnetic field which is responsive in intensity to the signal intelligence to be recorded. The thin edge preferably is in the form of a narrow edge surface in substantially confronting relation with the record medium. Because flux enters or leaves a magnetic surface perpendicularly thereto, the narrow surface defines or shapes the recording flux into a thin configuration. The recording flux extends therefrom in a thin configuration into the record medium in orthogonal relation with the record medium surface. The fineness of resolution of recorded intelligence is largely governed by the thickness of the thin edge means in relation to the frequencies of the intelligence and the relative velocity between the record medium and the thin edge.

In preferred embodiments of the invention thin edge means are provided on at least one of two spaced pole portions. The magnetic field induced in the pole portions extends between the pole portions and through the record medium to complete a magnetic circuit. The thin edge is disposed at a substantial angle to and preferably substantially transverse to the direction of relative movement between the record medium and the thin edge. Certain embodiments utilize magnetic pole portions or elements which define a non-magnetic gap and which have thin edges or narrow edge surfaces in mutual alignment at a substantial angle to the direction of relative movement between the pole portions and the record medium. The gap and the pole portions provide reluctance to cause the magnetic field to extend between the pole portions and through the record medium. Other embodiments utilize only a single unitary pole portion or element having no non-magnetic gap and having a thin edge or narrow edge surface. The reluctance of the pole portion causes the magnetic field to extend from the pole portion edge into the record medium.

One embodiment provides variable area recording by utilizing at least one pole portion or element which tapers to a point of juncture with another portion of a magnetic circuit. The varying magnetic field induced in the circuit magnetically saturates the pole portion for a distance from the point of juncture governed by the field intensity. The field extends from a thin edge or a narrow edge surface of the pole portion into the record medium along a length of the edge or edge surfaces which varies with the field intensity. A recording flux path of varying length thereby results and effects variable area recording.

Certain preferred embodiments have pole portions which are on opposite sides of a record medium and which define a non-magnetic gap through which the record medium moves. A thin edge or narrow edge surface on one or each of the pole portions is positioned adjacent to the record medium and is substantially transverse to the direction of relative movement between the record medium and the pole portions. In the manner hereinbefore mentioned, recording flux extends in a thin configuration from the thin edge or narrow edge surface orthogonally into the record medium.

Another embodiment has pole portions which are spaced apart a substantial distance in a direction substantially transverse to the direction of relative movement between the record medium and the pole portions. A thin edge or narrow edge surface on one pole portion is positioned adjacent to the record medium and is transverse to the direction of relative movement between the record medium and the pole portions. A magnetic field extends through the record medium between the pole portions and the thin edge or narrow edge surface defines recording flux which extends in a thin configuration into the record medium.

Another embodiment utilizies pole portions which are spaced apart a substantial distance in the direction of relative movement between the record medium and the pole portions. A thin edge or narrow edge surface on one pole portion is positioned adjacent to the record medium and is transverse to the direction of relative movement. A magnetic field extends between the pole portions and through the record medium in substantially the direction of relative movement, and a thin edge or narrow edge surface defines recording flux extending in a thin configuration into the record medium.

Transducer heads according to the invention provide distinct advantages. The fineness of resolution of recorded intelligence is governed largely by the thickness or width of the thin edge means or the narrow edge surface in relation to the frequencies of the intelligence and the relative velocity between the record medium and the transducer head. The thin edge or narrow edge surface may be very thin or narrow, as when they are produced by special techniques. High frequency intelligence may be recorded at slow relative velocities between head and record medium. The resolution of recorded intelligence is independent of the size of a non-magnetic gap. Wide dynamic range is provided, because the recording flux path on a record medium may vary widely with variations in input signal intelligence, thereby resulting in a wide variation of impressed magneto-motive force. Both variable intensity and variable area recording are provided. The invention alleviates the problems associated with variations in spacing between a recording head and a record medium because a relatively long recording flux path on the record medium increases the contact area without appreciably altering the over-all circuit of the magnetic field.

It is therefore an object of the present invention to provide novel and improved electromagnetic transducer heads.

An object of the invention is the provision of magnetic recording devices wherein thin edge means define recording flux of thin configuration extending into a record medium.

It is an object of the invention to provide magnetic recording devices capable of accurately recording high frequency intelligence at slow relative velocities between the devices and a record medium.

An object of this invention is to provide magnetic recording devices which record intelligence with a fineness of resolution governed by the size of a thin or narrow edge in relation to the intelligence frequencies and the relative velocity between the recording device and a record medium.

It is an object of the present invention to provide magnetic recording devices which record intelligence with a fineness of resolution independent of the size of a non-magnetic gap.

An object of this invention is the provision of a magnetic recording head which requires no non-magnetic gap.

It is an object of the invention to provide magnetic recording devices capable of wide dynamic range.

An object of the present invention is to provide electromagnetic transducer heads which alleviate the problems associated with variations in spacing between the head and the record medium.

It is an object of the present invention to provide electro-magnetic transducer heads which provide combined variable intensity and variable area recording.

An object of this invention is the provision of electromagnetic transducer heads which record intelligence in terms of varying recording flux intensity and in terms of the varying length of the path of the recording flux on the record medium.

Other objects, features and advantages of the invention will become apparent to those versed in the art from a consideration of the following description, the appended claims and the accompanying drawings, wherein:

Figures 1, 2, 3:
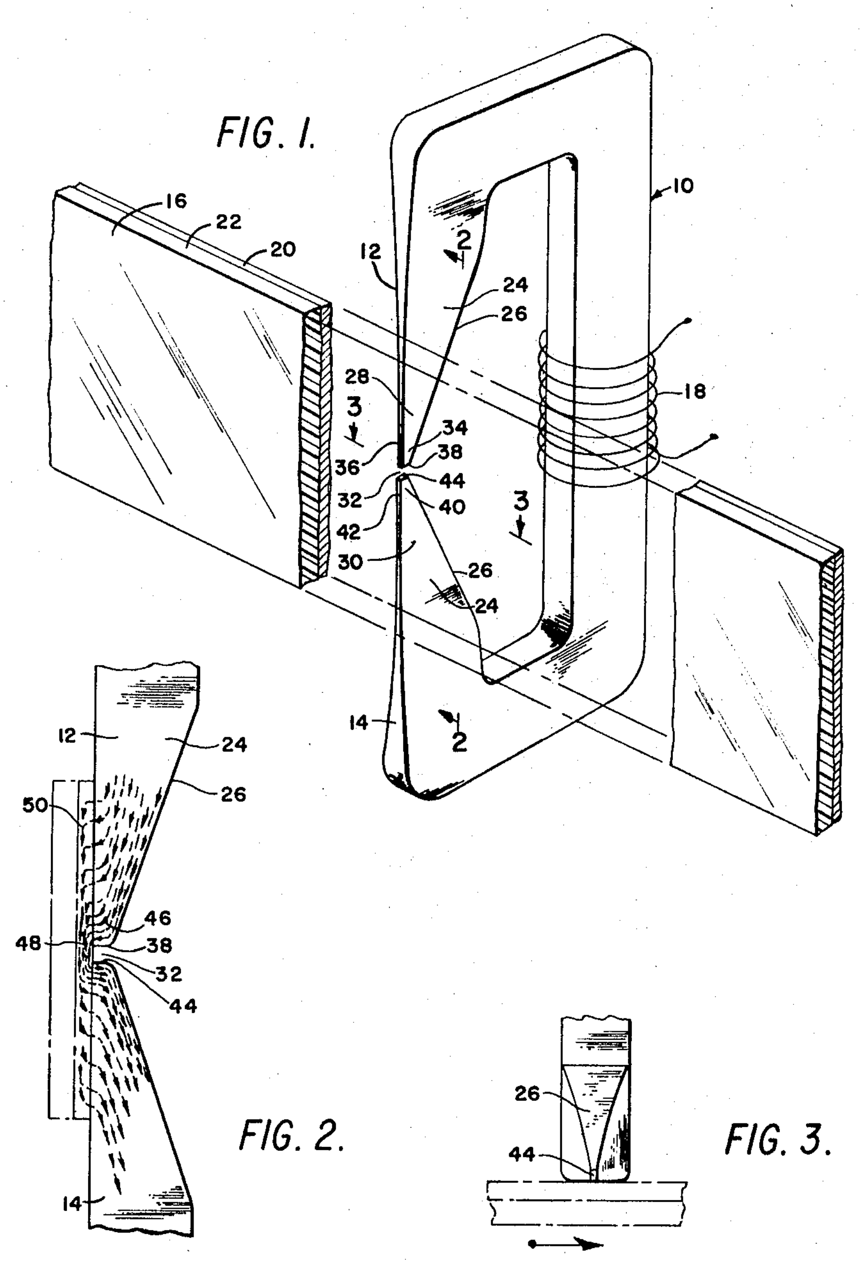
FIGURE 1 is a diagrammatic perspective view of a preferred embodiment of an electromagnetic transducer head according to the present invention.
FIGURE 2 is a partial elevational view taken at lines 2—2 in FIGURE 1.
FIGURE 3 is a fragmentary view taken at lines 3—3 in FIGURE 1.

Referring to the drawings, and particularly to FIGURES 1, 2 and 3, there is shown a preferred embodiment of an electromagnetic transducer of the present invention. A generally C-shaped core member 10 has leg sections 12, 14 adjacent to a movable record medium or tape 16. An electrical winding or coil 18 is wound on the core in conventional manner and is connected with a source of electrical signal input (not shown). The record medium comprises a thin magnetizable layer 20 on a plastic backing 22. Each core leg section has a sloping side surface 24 and an inclined rear surface 26. The leg sections 12, 14 taper into thin pole portions 28, 30, respectively, which define a non-magnetic gap 32. Pole portion 28 has a tip 34, a thin edge or narrow front edge surface 36 and an end surface 38 at the gap. Similarly, pole portions 30 has a tip 40, a narrow front edge surface 42 and an end surface 44. Because permeability varies with flux density, the core material and the relative sizes of the core, the tapered leg sections and the pole portions are determined in accordance with the reluctance equation $$R=\frac{l}{\mu A}$$

where R is the reluctance, $l$ the length of a member or portion, A the cross-sectional area, and $\mu$ the permeability.

Although the thin edges or narrows front edges surfaces are preferably transverse to the direction of relative movement between the record medium and the transducer head, as shown, or substantially transverse to this direction, the edges or narrow surfaces may be disposed at an angle to this direction provided that the angle is substantial. Playback or reproduction of recorded intelligence is effected by a transducer edge oriented like the recording transducer edge in relation to the direction of relative movement of the record medium.

In the operation of the transducer head of FIGURE 1, input signal voltage is applied across the coil 18 and induces in the core 10 a magnetic field which varies in intensity or density in accordance with the time-variations of the input signal intelligence. The magnetic field or flux is concentrated in pole portions 28, 30 and especially in pole tips 34, 40, as indicated at 46 in FIGURE 2, because of their small cross-sectional areas. These small areas and the non-magnetic gap present sufficient reluctance to cause part of the magnetic field to extend between the thin edges and through the record medium to complete a magnetic circuit. The magnetizable layer 20 of the record medium presents the path of least reluctance and constitutes an integral part of the magnetic circuit. Because magnetic flux enters or leaves a magnetic surface perpendicularly thereto, the flux extends perpendicularly from the narrow edge surfaces 36, 42 and enters the magnetizable layer 20 of the record medium perpendicularly thereto, as shown. By virtue of the geometry involved, the thin edges or narrow edge surfaces shape or define recording flux of thin configuration which extends from the edges or narrow surfaces into the record medium in orthogonal relation with the surface of the magnetizable layer. The recording flux thus defined is most concentrated in the region of the non-magnetic gap and the pole tips, as indicated by the numeral 48. Being a part of the magnetic circuit, the recording flux varies in intensity with the magnetic field in accordance with the input signal intelligence, and impresses varying remanent magnetism on the record medium.

The fineness of resolution of recorded intelligence is governed largely by the thickness or width of the thin edge or narrow edge surface in relation to the frequencies of the intelligence and the relative velocity between the transducer head and the record medium. Because flux enters or leaves a magnetic surface perpendicularly thereto, the edges or edge surfaces are preferably formed with sharply defined corners in order to minimize lateral fringing of recording flux in the direction of the relative movement of the record medium. In order to limit the lateral fringing of recording flux, the record medium is preferably positioned in contact with or in close proximity to the pole portions.

The accuracy or fineness of resolution of recorded intelligence is independent of the dimensions of the non-magnetic gap 32. The gap merely serves to facilitate control of the flux pattern and to cause the recording flux to extend into the record medium.

Variations in magnetic field intensity with signal intelligence variations may produce corresponding variations in the length of the recording flux path on the record medium. Increasing the flux density beyond the density which substantially saturates the pole tips causes the recording flux and the recording path on the record medium to extend to correspondingly greater distances or lengths along the edge surfaces 36, 42. Recording may therefore be effected by a combination of variable intensity and variable area recording, wherein intelligence is recorded both in terms of varying recording flux intensity and in terms of the varying lengths of the recording flux path on a record medium. The remanent magnetism on the record medium and the reproduction intensity vary in accordance with both of these factors.

From the foregoing, it will be understood that the invention provides wide dynamic range recording, because a long recording flux path is provided on the record medium and because the length of the recording flux path may be varied in accordance with the input signal intelligence. A large and widely varying retained or impressed magneto-motive force is impressed on the record medium. The problems associated with variations in the spacing between conventional recording heads and record mediums are alleviated because the recording flux path on the record medium is long in comparison to the space between the transducer head and a record medium. The over-all magnetic field circuit is therefore not appreciably altered by variations in head-to-record medium spacing.

Figures 4, 5, 6, 7, 8, 9, 10:
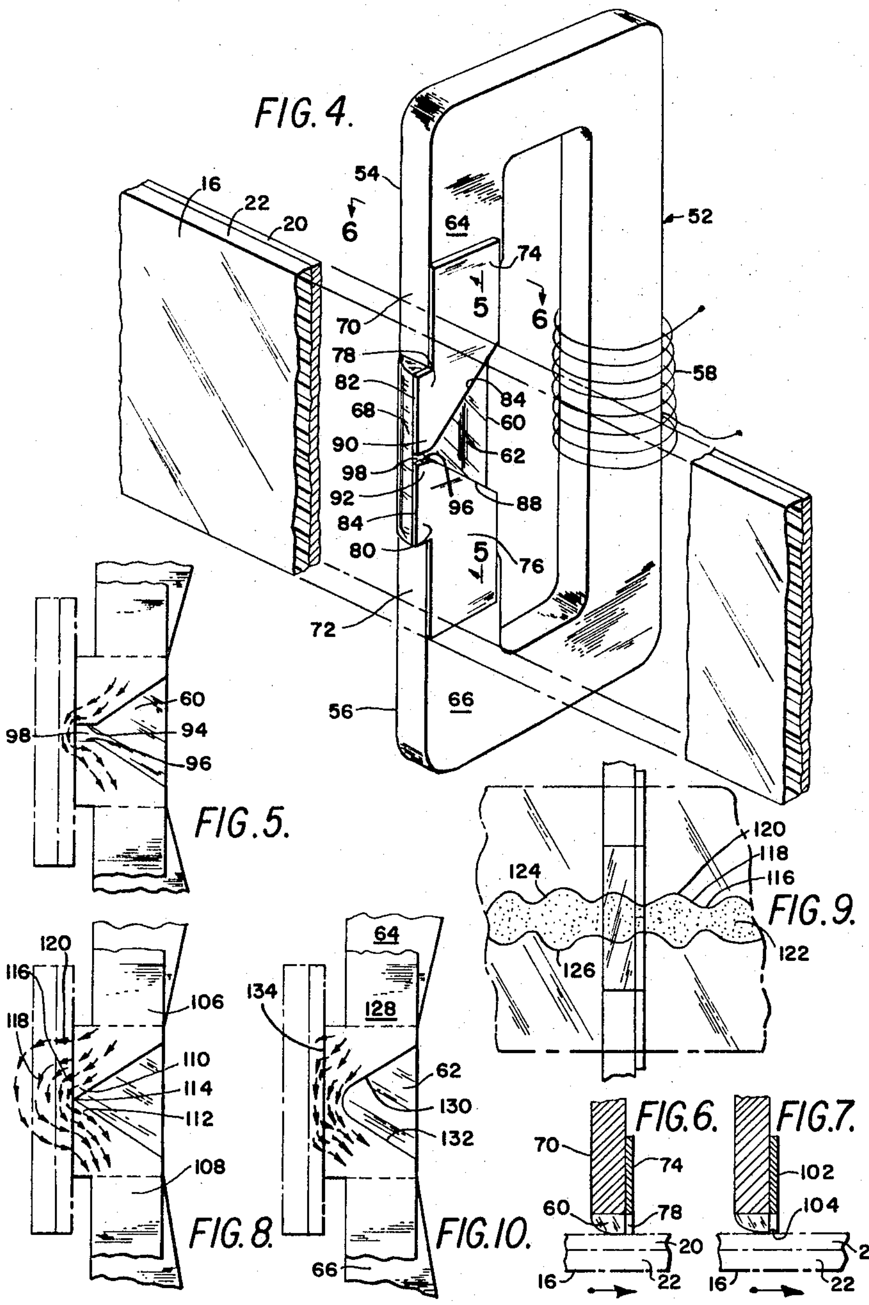
FIGURE 4 is a diagrammatic perspective view of another preferred embodiment of a transducer head of the present invention.
FIGURE 5 is a partial elevational view taken at lines 5—5 in FIGURE 4.
FIGURE 6 is a fragmentary sectional view taken at lines 6—6 in FIGURE 4.
FIGURE 7 is a fragmentary sectional view, similar to that of FIGURE 6, showing a modification of the transducer head of FIGURE 4.
FIGURE 8 is a partial elevational view, similar to the view of FIGURE 4, showing elements of a modified embodiment of the invention.
FIGURE 9 is a diagrammatic elevational view of the modified embodiment of FIGURE 8.
FIGURE 10 is a partial elevational view, similar to the views of FIGURES 5 and 8, showing elements of another modified embodiment of the invention.

FIGURES 4, 5 and 6 illustrate another preferred embodiment of the invention. A generally C-shaped core 52 has leg sections 54, 56 adjacent to a movable record medium or tape 16. The record medium has a magnetizable layer 20 on a plastic backing 22. An electrical winding or coil 58 on the core is connected with a source of electrical signal input (not shown). The core leg sections 54, 56 are widely separated and a non-magnetic insert 60 is mounted between them. The insert is preferably fabricated of glazed ceramic, epoxy or glass. The insert has a flat side surface 62 which is co-planar with side surfaces 64, 66 of the core leg sections. A curved surface 68 of the insert extends beyond front surfaces 70, 72 of the leg sections to slidably receive the record medium 16, as indicated in FIGURES 4 and 6.

Thin magnetic pole portions in the form of separate pole elements 74, 76 are positioned on the side surfaces 64, 66 of the leg sections. Pole element 74 is mounted on side surface 64 of leg section 54 and on co-planar surface 62 of insert 60. Pole element 76 is similarly mounted on surface 66 of leg section 56 and on the insert surface

62. The insert provides non-magnetic support for the thin pole elements. Extensions 78, 80 of pole elements 74, 76, respectively, extend beyond the leg sections and are co-extensive with curved surface 68 of the insert 60, as indicated in FIGURES 4 and 6. Sharply defined narrow edge surfaces 82, 84 of the respective pole elements 74, 76 are in confronting relation with the record medium 16. The pole elements are tapered or inclined at their rear edges 86, 88 to define pole tip portions 90, 92, respectively. Confronting end surfaces 94, 96 of the pole elements define a non-magnetic gap 98. As mentioned hereinbefore relative to the transducer head of FIGURE 1, the reluctance equation is considered in connection with the core material and the relative sizes of the thin pole elements and the cross-sectional area of the core.

As stated in connection with the transducer head of FIGURE 1, the edge surfaces of the pole elements may be disposed at an angle to the direction of relative movement between the record medium and the transducer head, although they are preferably disposed substantially transverse to this direction.

The materials and the sizes of the core and pole portions may preferably be governed by the frequencies of the intelligence to be recorded. Smaller dimensions are preferable for higher frequencies. A ferrite magnetic structure may be utilized for frequencies higher than 500 kilocycles, in order to minimize eddy current losses and heating effects.

The operation of the transducer head of FIGURE 4 is generally similar to that hereinbefore described for the embodiment shown in FIGURE 1. The signal input intelligence to the coil 58 induces a varying magnetic field in the core 52. Magnetic flux concentrates in the thin pole elements 74, 76, and extends from the narrow edge surfaces 82, 84 orthogonally into the record medium. Recording flux of thin configuration extends between the thin edge surfaces and into the record medium, as indicated in FIGURE 5. The record medium 16 is spaced from the front surfaces 70, 72 of the core leg sections by the non-magnetic insert 60, to prevent flux from extending from these surfaces into the record medium and to insure that only the recording flux will extend into the record medium.

The transducer head of FIGURE 4 has the same general characteristics and provides the same general advantages as the head of FIGURE 1. The fineness of resolution of intelligence is governed largely by the thickness of a thin edge or narrow edge surface in relation to the intelligence frequency and in relation to the relative velocity of the record medium. The fineness of resolution is independent of the size of any non-magnetic gap. The transducer head may provide a combination of variable intensity and variable area recording, intelligence being recorded both in terms of recording flux intensity variations and in terms of variations in the length of the recording flux path on the record medium. The transducer head of FIGURE 4 is capable of wide dynamic range for reasons similar to those hereinbefore mentioned relative to the transducer head of FIGURE 1.

Very thin pole portions or elements 74, 76 may be provided to define a very thin recording flux for the fine resolution of high frequency intelligence, within the definition capabilities of the record medium. Such pole elements may be fabricated or may be formed on the transducer head by appropriate methods such as vacuum-deposition techniques. For example, pole elements of a thickness of four millionths of an inch ($4\times10^{-6}$) or one thousand Angstroms (1000 A.), might be provided on a core 0.2 inch high and 0.001 inch thick. The narrow edge surfaces of such pole elements define a recording flux approximately five millionths of an inch ($5\times10^{-6}$ in.) thick. Therefore, pole elements of these dimensions are capable of recording frequencies of three megacycles at a relative velocity of approximately 15 in./sec. between transducer head and record medium. Thinner pole elements or narrower edge surfaces effect the definition of correspondingly thinner recording flux and the recording of correspondingly higher frequencies at a given speed or the recording of given frequencies at correspondingly slower relative velocities. For example, pole elements one or two millionths of an inch thick will provide for correspondingly higher frequency recording or recording at correspondingly slower relative velocities.

FIGURE 7 illustrates a modified form of pole element 102 which has a concave or hollow-ground edge surface 104 confronting the record medium. Because flux leaves the surface 102 perpendicularly, this surface configuration tends to focus the recording flux at the record medium surface and to minimize lateral fringing of the flux.

FIGURES 8 and 9 show another embodiment of the invention. Modified pole elements 106, 108 taper to define triangular tip portions 110, 112 which taper to a point of juncture or contact at 114. In the operation of the transducer head of FIGURE 8, variations in input signal intelligence produce corresponding variations in the intensity or density of a magnetic field in a circuit which includes the pole elements. The tip portions 110, 112 become magnetically saturated at a very low flux density. The magnetic field saturates the tapered pole portions or elements for distances from the point of juncture which vary with the field intensity. The magnetic field therefore extends outwardly from the narrow edge surfaces of the pole portions or elements along respective lengths thereof which vary in accordance with the field intensity and the input intelligence, as indicated in FIGURE 8 by the progressively extending flux lines 116, 118, 120. Variations in the recording flux path length on the record medium are thus effected. Relatively high degrees of saturation may cause the recording flux to extend or fringe beyond the magnetizable layer of the record medium into the plastic backing, as indicated in FIGURE 8.

As indicated in FIGURE 9, the transducer head of FIGURE 8 is adapted for recording by the variable area method. Boundary lines 124, 126 define a recorded area within which the magnetizable layer is substantially magnetically saturated. The length of the recorded area between the boundary lines at particular elemental increments correspond to input signal intensities at particular instants. Thus, the points 116, 118, 120 in FIGURE 9 correspond to the recording flux intensities represented by flux lines 116, 118, 120 in FIGURE 8.

It will readily be understood that transducer heads having only one pole portion or element tapering to a point of juncture with another portion of a magnetic circuit may function in a manner generally similar to that described in connection with the transducer head of FIGURE 8. Such a pole element or portion would be magnetically saturated for a length or distance governed by the field intensity and the input signal intelligence.

FIGURE 10 illustrates an embodiment of the invention wherein only a signal thin pole portion or element 128 is utilized. The pole element is positioned on side surfaces 64, 66 of the core leg sections and on the coplanar surface 62 of the non-magnetic insert 60. Inclined or tapering rear edges 130, 132 defined a reduced central portion, and a continuous narrow edge surface 134 confronts the record medium. The operation of the transducer head of FIGURE 10 is generally similar to that hereinbefore described for the head shown in FIGURE 1. Because of the high reluctance provided by the reduced central portion and by the thinness of the pole element, sufficient recording flux extends from the narrow edge surface 134 into the record medium, in the manner indicated in FIGURE 10, to effect recording without requiring a non-magnetic gap.

Figure 11:
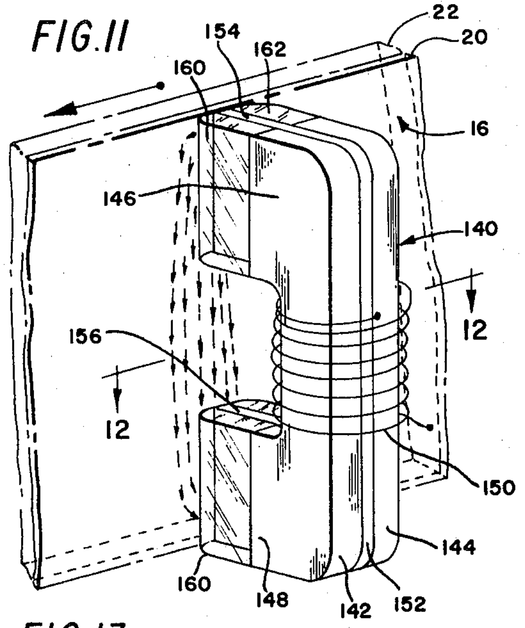
FIGURE 11 is a diagrammatic perspective view of another embodiment of the invention.
Figure 12:
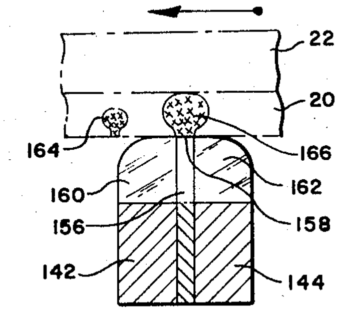
FIGURE 12 is an enlarged sectional view taken at lines 12—12 in FIGURE 11.

FIGURES 11 and 12 illustrate an embodiment of the invention, wherein a heavy generally U-shaped core 140 is formed by the two core members 142, 144, and has leg sections 146, 148 which are widely separated in the direction transverse to the direction of relative movement between the tape 16 and the leg sections. A coil 150 on the core is connected with a source of electrical signal input (not shown). A thin pole member 152 is mounted between the core members and has integral thin pole portions or elements 154, 156 extending from the respective leg sections 146, 148 to positions adjacent to the record medium, as shown. The elements 154, 156 are widely separated and are in mutual alignment transverse to the direction of relative movement between the tape and the pole elements. A sharply defined narrow edge surface 158 is defined on thin pole element 156, and a similar edge surface is defined on the thin pole element 154. The narrow edge surfaces confront the magnetizable layer 20 of the tape 16, as shown. The lengths of the edges or narrow edge surfaces of the pole portions or elements may preferably be several times the thickness of the magnetizable layer 20 to provide desired dynamic recording range. Non-magnetic inserts 160, 162 on respective sides of thin pole element 154 and on the respective sides of pole element 156 provide structural support and have curved outer surfaces to slidably receive the record medium. These inserts are preferably formed of glass or glazed ceramic epoxy, like the non-magnetic inserts of the transducer head of FIGURE 4.

Although the pole elements are preferably positioned transverse to the direction of relative movement between record medium and the transducer head, they may be also disposed at a substantial angle to this direction of relative movement, as hereinbefore mentioned relative to the recording device of FIGURE 1.

In the operation of the device of FIGURES 11 and 12, signal input intelligence to the winding 150 induces in the core 140 a magnetic field which varies in intensity in accordance with the input. Magnetic flux concentrates in the thin pole elements 154, 156 and extends from their edges or narrow edge surfaces orthogonally into the record medium. In the general manner described in relation to the device of FIGURE 4, accurate resolution of recording flux is thereby provided in the magnetizable layer 20 of the record medium. The recording channels are adjacent to the respective thin pole elements. As indicated in FIGURE 11, some lateral fringing of flux occurs in the record medium between the thin pole elements or portions. In FIGURE 12 a residual flux pattern 164 represents a recorded input signal of relatively low intensity, and a residual flux pattern 166 represents a recorded input of relatively high intensity. The resolution of the intelligence recorded is largely governed by the thickness of the pole elements or portions relative to the frequency of intelligence and the relative velocity between the record medium and the pole elements. As mentioned hereinbefore in connection with the device of FIGURE 4, very thin pole elements may be provided for fine resolution of high frequency intelligence.

Figure 13:
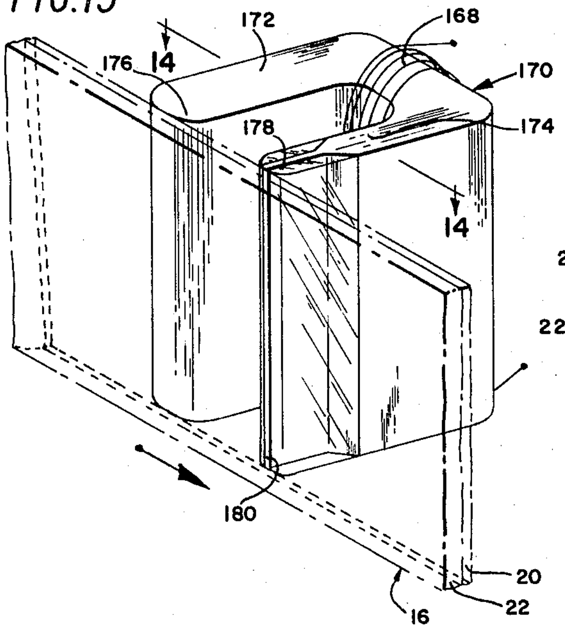
FIGURE 13 is a diagrammatic perspective view of another embodiment of the invention.
Figure 14:
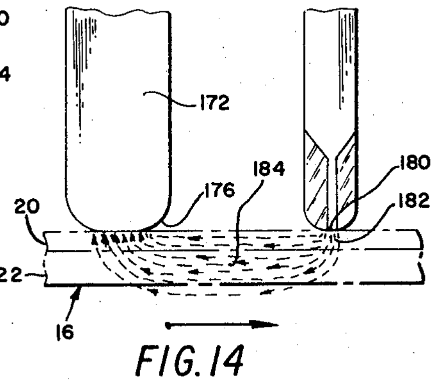
FIGURE 14 is a partial plan view taken at lines 14—14 in FIGURE 13.

Another embodiment of the invention is shown in FIGURES 13 and 14. A coil 168 is wound on a wide core 170 and is connected with a source of signal intelligence (not shown). Leg sections 172 and 174 extend toward the record medium 16. Leg section 172 has a heavy rounded pole portion 176 which is adapted for sliding engagement with the record medium. A thin pole portion or pole element 178 extends from leg section 174 and has its outer edge positioned adjacent to the record medium with a narrow edge surface 180 confronting the magnetizable layer 20 of the record medium. Non-magnetic inserts, similar to the inserts 160, 162 of the transducer head of FIGURE 11, provide structural support for the pole element. Rounded outer surfaces of the inserts slidably accommodate the record medium. As shown, the thin pole element 178 and the rounded pole portion 176 are spaced a considerable distance apart in the direction of relative movement between the record medium and the transducer head, and are transverse to the direction of relative movement.

In the operation of the transducer head of FIGURE 13, input is applied across the coil 168 to produce in the core a magnetic field which varies in intensity in accordance with the input intelligence. Flux of this field extends between the thin pole element 178 and the pole portion 176 to complete a magnetic circuit through the record medium, as indicated in FIGURE 14. Recording flux is finely defined adjacent to the edge or thin edge surface 180 of pole element 178, as indicated at 182 in FIGURE 14, because magnetic flux enters and leaves a magnetic member perpendicularly to its surface. This accurately defined recording flux is the last applied to the magnetizable layer of the record medium, and is the most concentrated. Accurate recording is therefore effectively accomplished. As indicated at 184 in FIGURE 14, the flux fringes laterally between the pole portion and the thin pole element.

Figures 15, 16, 17, 18, 19, 20:
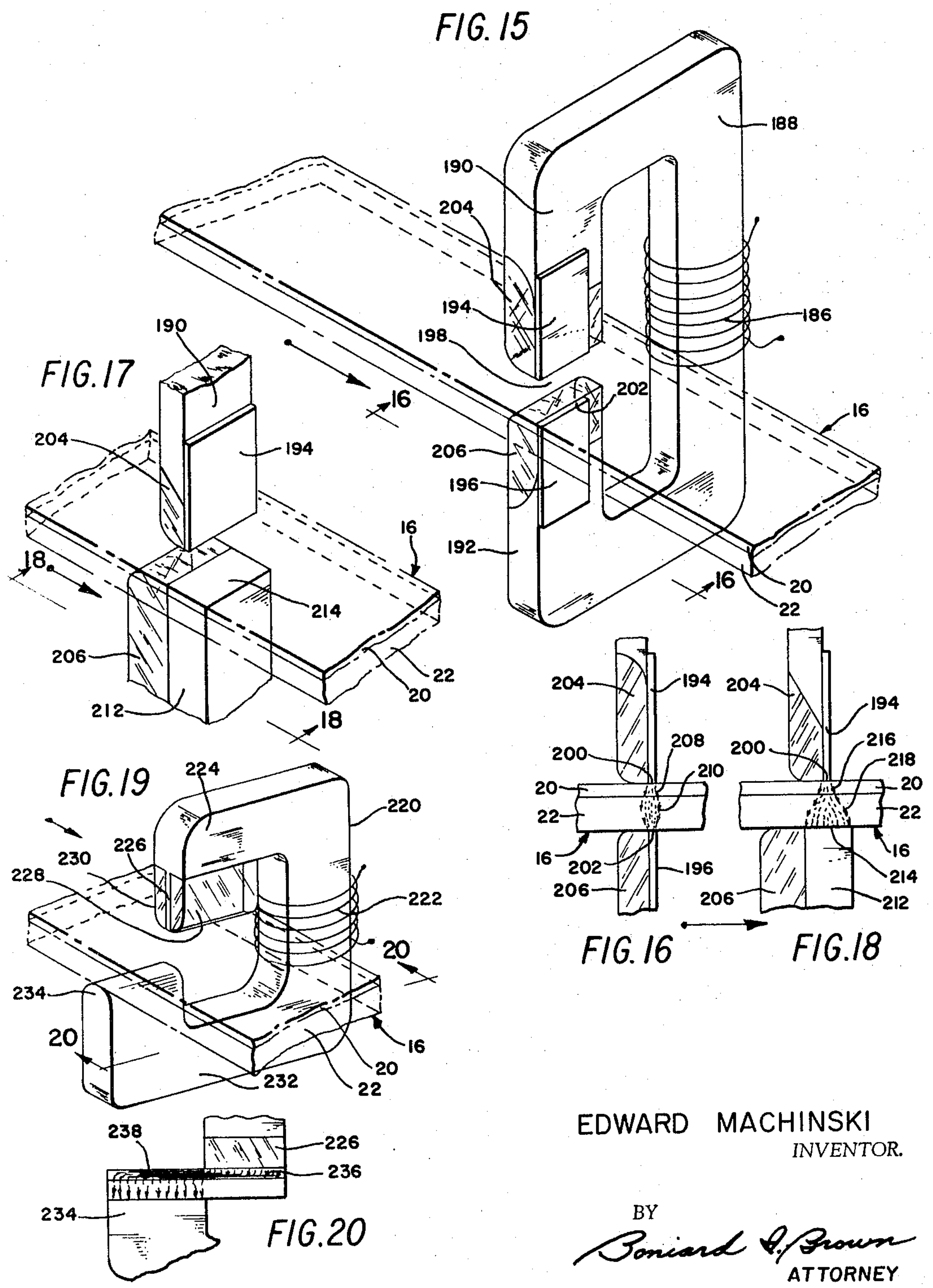
FIGURE 15 is a diagrammatic perspective view of another embodiment of transducer head according to the invention.
FIGURE 16 is a partial front elevational view taken at lines 16—16 in FIGURE 15.
FIGURE 17 is a partial diagrammatic perspective view of a modified form of the transducer head of FIGURE 15.
FIGURE 18 is a partial front elevational view taken at lines 18—18 in FIGURE 17.
FIGURE 19 is a diagrammatic perspective view of another embodiment of the invention.
FIGURE 20 is a partial side elevational view taken at line 20—20 in FIGURE 19.

FIGURES 15 and 16 illustrate another preferred embodiment of the present invention. An electrical winding or coil 186 is wound about a generally C-shaped core 188 and is connected with a source of input signal intelligence (not shown). Two leg sections 190, 192 extend toward each other, as shown. Thin pole elements or portions 194, 196 are mounted on side surfaces of the respective leg sections 190, 192. The thin pole elements are mutually aligned in confronting relation and define a non-magnetic gap 198. The gap accommodates the record medium or tape 16 with the pole elements on opposite sides of the record medium. The tape is movable relative to the pole elements in the direction indicated by the arrows in FIGURES 15 and 16. Each of the thin pole elements has its outer edge positioned adjacent to the record medium, and narrow edge surfaces 200, 202 of the respective pole elements 194, 196 confront the magnetizable layer 20 of the record medium. Non-magnetic spacers 204, 206 adjacent to the respective pole elements provide structural support and have rounded outer surfaces to slidably accommodate the record medium. The thin pole elements may be generally similar to the pole elements of the embodiments shown in FIGURE 4 and hereinbefore described. The pole elements or portions may be formed integrally with the leg sections of the core.

In the operation of the device of FIGURE 11, signal input is applied across the coil 186 to produce in the core a magnetic field which varies in accordance with the input intelligence. In the manner hereinbefore described relative to other embodiments of the invention, magnetic flux concentrates in the thin pole elements. Recording flux extends between the confronting edges or narrow edge surfaces of the pole elements, in the manner indicated in FIGURE 16. Recording flux having a thin configuration extends from the edge or edge surface 200 of pole element 194 into the magnetizable layer 20 of the record medium. Accurate resolution of recording flux is effected in the record medium adjacent to the edge of the pole element, as indicated at 208 in FIGURE 16. Some fringing of the flux occurs between the pole elements, as indicated at 210.

FIGURES 17 and 18 illustrate a modification of the transducer head of FIGURE 15, wherein a heavy or thick pole portion 212 is utilized instead of the thin pole element 196 of FIGURE 15. A relatively large rectangular end surface 214 of pole portion 212 confronts the record medium and confronts the narrow edge surface 200 of pole element 194. In the manner hereinbefore described, accurately defined recording flux is produced adjacent to the edge or narrow edge surface of thin pole element 194, as indicated at 216 in FIGURE 18. The flux fringes or spreads, as indicated at 218, in passing through the record medium to the surface 214 of the heavy pole portion.

FIGURES 19 and 20 illustrate another form of transducer head according to the invention. A magnetic core 220 has a coil or winding 222 wound thereon and connected with a source of electrical input (not shown). A leg section 224 of the core has a thin pole portion or element 226 extending therefrom to a position adjacent to the record medium 16. The thin pole portion or element is like those herein described in connection with other embodiments of the invention. Non-magnetic inserts 228, 230 are similar to those of embodiments hereinbefore described. An elongated leg section 232 extends outwardly beyond the thin pole element 226 and has a rounded pole portion 234 adjacent to the record medium, as shown. The thin pole element and the heavy pole portion 234 are displaced or staggered in the direction transverse to the direction of relative movement between the record medium and the pole portions. The record medium or tape 16 moves between the pole portions in the manner indicated in FIGURES 19 and 20.

In operation, magnetic flux is produced by the application of electrical signal input across the coil 222 and extends between the edge of pole element 226 and the heavy rounded pole portion 234. In the manner hereinbefore described, accurately defined recording flux is defined adjacent to the edge or narrow edge surface of the thin pole element, as indicated at 236 in FIGURE 20. The flux takes the general path indicated at 238 in passing transversely through the record medium between pole element 226 and pole portion 234.

Reproduction or playback of intelligence recorded by certain of the transducer heads hereinbefore described may be accomplished by any of these transducer heads except the head of FIGURE 10, which utilizes only a single pole element with no non-magnetic gap. In reproduction or playback, a transducer head senses the recorded intelligence in terms of variations in the magnetic field intensity induced in its pickup core. This intensity at a particular instant is a function of the remanent induction of a particular elemental portion of the magnetizable layer of the record medium passing the transducer head at that particular instant.

Those versed in the art will readily appreciate that the present invention achieves the objects and realizes the advantages hereinbefore mentioned.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. An electromagnetic transducer comprising, a record medium, a magnetic core, said core including thin edge pole pieces extending substantially beyond the edges of and in the same plane as the surface of said record medium, said thin edge pole pieces being in contact with said record medium and disposed at a substantial angle to the direction of relative movement therebetween, the thin edge pole pieces having a magnetic gap between them; means cooperating with the thin edge pole pieces to define a magnetic path, and means for inducing in the magnetic path between the thin edge pole pieces and across said gap through said record medium a magnetic field which varies in response to the time-variations in the signal intelligence to be recorded, said thin edge pole pieces defining the magnetic path as a flux path of thin configuration extending into the record medium between said pole pieces to record the intelligence.

2. An electromagnetic transducer comprising a magnetic core having pole pieces, said pole pieces comprising thin edge means having a pair of narrow edge surfaces substantially confronting a record medium and disposed at a substantial angle to the direction of relative movement therebetween, said narrow edge surfaces extending substantially beyond the edges of and in the same plane as the surface of said record medium, means cooperating with and extending beyond the edges of the thin edge means to generate a magnetic path through said medium between said narrow edge surfaces, and means for inducing in the path a magnetic field which varies in response to the time-variations in the signal intelligence to be recorded, said narrow edge surfaces defining a magnetic flux path of thin configuration extending into the record medium between said narrow edge surfaces to record the intelligence.

3. A magnetic recording device comprising first and second spaced magnetic pole portions in magnetic communication with a record medium, said pole portions extending substantially beyond the edges of and in the same plane as the surface of said record medium, said first portion having thin edge means in contact with the record medium and disposed at a substantial angle to the direction of relative movement therebetween, and means for inducing in the pole portions a magnetic field responsive in intensity to the signal intelligence to be recorded, said magnetic field extending in an extremely narrow path between the pole portions and through the record medium to complete a magnetic circuit, said thin edge defining a magnetic flux extending in a thin configuration from the thin edge of one of said pole portions through the record medium and into the other of said pole portions, whereby the intelligence is recorded during relative movement of the record medium passing said magnetic pole portions.

4. A magnetic recording device comprising first and second magnetic pole portions in spaced relation and in magnetic communication with a magnetizable record medium, said pole portions extending substantially beyond the edges of and in the same plane as the surface of said record medium, a narrow edge surface on said first pole portion in substantially contacting relation with the record medium and disposed at a substantial angle to the direction of relative movement therebetween, and means for inducing in the pole portions a magnetic field responsive in intensity to the signal intelligence to be recorded, said magnetic field extending between the pole portions and through the record medium to complete a magnetic circuit, said narrow edge surface defining a recording flux portion of said field to extend in a thin configuration from the narrow edge surface of one magnetic pole portion orthogonally into the record medium returning therefrom into the other of said magnetic pole portions, whereby the intelligence is recorded during relative movement between the record medium and said recording flux.

5. A magnetic recording device comprising a C-shaped magnetic core, said C-shaped magnetic core comprising first and second pole portions defining a non-magnetic gap for movement therethrough of a magnetizable record medium, a thin edge on said first pole portion disposed adjacent to the record medium and at a substantial angle to the direction of relative movement between the record medium and the pole portions, said second pole portion being disposed on the opposite side of the record medium from the first pole portion, and means for inducing in the pole portions a magnetic field responsive in intensity to the signal intelligence to be recorded, said magnetic field extending through the record medium between said thin edge and the second pole portion, said thin edge of the first pole portion defining a recording flux portion of the magnetic field to extend in a thin configuration from the thin edge into the record medium, whereby the intelligence is recorded with a fineness of resolution governed by the thickness of said thin edge in relation to the frequencies of the intelligence and the relative velocity between the record medium and said thin edge.

6. A magnetic recording device comprising a C-shaped magnetic core, said core including first and second pole portions in spaced relation, a thin pole element positioned on said first pole portion and extending toward the second pole portion to define a non-magnetic gap for movement therethrough of a magnetizable record medium, said thin pole element and second pole portion being disposed on opposite sides of the record medium, a narrow edge surface of the said thin pole element substantially confronting the record medium and in alignment with and confronting the second pole portion at a substantial angle to the direction of relative movement between the record medium and the pole portions, and means for inducing in the pole portions a magnetic field responsive in intensity to the signal intelligence to be recorded, said magnetic field extending through the record medium between the pole portions, said narrow edge surface of the first pole element defining a recording flux portion of said field to extend in a thin configuration from the narrow edge surface orthogonally into the record medium, whereby the intelligence is recorded with a fineness of resolution governed by the width of said narrow edge surface in relation to the frequencies of the intelligence and the relative velocity between the record medium and the pole portions.

7. An electromagnetic transducer comprising thin edge means having a pair of thin-edge pole pieces arrayed in-line, said thin-edge pole pieces being in contact with, and perpendicular to the line of travel of an elongated recording medium, the extreme lateral edge thin-edge pole pieces extending substantially beyond the edges of and in the same plane as the surface of said recording medium, and there being a gap between said poles; means for effecting relative movement between the record medium and the thin edge means, and means for inducing in the thin edge means a magnetic field responsive to the signal intelligence to be recorded, said thin edge means defining magnetic flux path of thin configuration, said flux path extending into the record medium across said gap from one to the other of said pair of poles to record said intelligence.

References Cited by the Examiner

UNITED STATES PATENTS

| | | | |
|---|---|---|---|
| 2,483,123 | 9/1949 | Clapp | 179—100.2 |
| 2,546,850 | 3/1951 | Chancenotte | 179—100.2 |
| 2,585,932 | 2/1952 | Hare | 179—100.2 |
| 2,594,414 | 4/1952 | Garreau | 179—100.2 |
| 2,822,427 | 2/1958 | Atkinson et al. | 179—100.2 |
| 2,840,440 | 6/1958 | McLaughlin et al. | 179—100.2 |

BERNARD KONICK, *Primary Examiner.*

ELI J. SAX, D. G. REDINBAUGH, J. R. GOUDEAU, A. I. NEUSTADT, *Assistant Examiners.*